United States Patent
Blavius et al.

(10) Patent No.: US 9,761,331 B2
(45) Date of Patent: Sep. 12, 2017

(54) LOWER NOZZLE FOR USE IN NUCLEAR FUEL ASSEMBLY

(75) Inventors: Dirk Blavius, Erlangen (DE); Erhard Friedrich, Eckental (DE); Werner Meier, Kunreuth (DE)

(73) Assignee: AREVA NP, Courbevoie (FR)

( * ) Notice: Subject to any disclaimer, the term of this patent is extended or adjusted under 35 U.S.C. 154(b) by 259 days.

(21) Appl. No.: 13/822,516

(22) PCT Filed: May 11, 2012

(86) PCT No.: PCT/EP2012/058739
§ 371 (c)(1),
(2), (4) Date: Jun. 10, 2013

(87) PCT Pub. No.: WO2012/159901
PCT Pub. Date: Nov. 29, 2012

(65) Prior Publication Data
US 2014/0064428 A1    Mar. 6, 2014

(30) Foreign Application Priority Data

May 20, 2011 (EP) .................................... 11305616

(51) Int. Cl.
*G21C 3/32* (2006.01)
*G21C 3/33* (2006.01)
*G21C 3/322* (2006.01)

(52) U.S. Cl.
CPC .......... *G21C 3/3206* (2013.01); *G21C 3/3305* (2013.01); *G21C 3/322* (2013.01); *Y02E 30/40* (2013.01)

(58) Field of Classification Search
CPC .......... G21C 19/307; G21C 3/32; G21C 3/62; G21C 3/322; G21C 3/3315; G21C 3/3206;
(Continued)

(56) References Cited

U.S. PATENT DOCUMENTS 3,689,358 A * 9/1972 Smith ............................ 376/440
4,111,464 A * 9/1978 Asano et al. ................. 285/111
(Continued)

FOREIGN PATENT DOCUMENTS

EP     0184219 A1    6/1986
EP     0455010 A1    11/1991
(Continued)

OTHER PUBLICATIONS

International Search Report for corresponding International Application PCT/EP2012/058739.

*Primary Examiner* — Jack W Keith
*Assistant Examiner* — Daniel Wasil
(74) *Attorney, Agent, or Firm* — Davidson, Davidson & Kappel, LLC

(57) ABSTRACT

A lower nozzle for use in a nuclear fuel assembly provided. The lower nozzle is of the type having an axis and comprising a transverse lower tie plate for channeling the coolant through the lower tie plate and a tubular skirt extending axially from the periphery of the lower tie plate, the skirt delimiting an axial housing closed at one end by the lower tie plate and open at the opposite end, a debris filter configured for axial insertion in the housing and snap-fit springs for retaining the debris filter in the housing after insertion. The springs are configured to shift the debris filter axially towards the lower tie plate.

19 Claims, 3 Drawing Sheets

(58) Field of Classification Search
CPC ...... G21C 3/352; G21C 1/086; G21C 3/3305; G21C 3/34; G21C 7/117; G21C 15/02; G21C 15/24; G21C 2003/3432; G21C 3/30; G21C 3/3566; G21Y 2002/201; G21Y 2002/302
USPC ....... 376/362, 313, 434, 443, 252, 352, 448, 376/449, 412; 285/921, 110
See application file for complete search history.

(56) References Cited

U.S. PATENT DOCUMENTS

| | | | | |
|---|---|---|---|---|
| 4,265,244 A | * | 5/1981 | Hill | 604/175 |
| 4,664,879 A | * | 5/1987 | Blaushild | 376/352 |
| 4,664,880 A | * | 5/1987 | Bryan | G21C 3/3206 376/313 |
| 4,684,495 A | * | 8/1987 | Wilson et al. | 376/352 |
| 4,684,496 A | * | 8/1987 | Wilson | G21C 3/32 210/521 |
| 5,030,412 A | | 7/1991 | Yates et al. | |
| 5,180,545 A | | 1/1993 | Grattier | |
| 5,289,514 A | | 2/1994 | Lippert et al. | |
| 5,347,560 A | | 9/1994 | Lippert | |
| 5,479,461 A | * | 12/1995 | Kilian | G21C 3/3206 376/313 |
| 5,481,577 A | * | 1/1996 | Yates | G21C 3/3206 376/313 |
| 5,844,958 A | * | 12/1998 | Leroux et al. | 376/446 |
| 6,320,922 B1 | * | 11/2001 | Peters et al. | 376/264 |
| 2006/0283790 A1 | | 12/2006 | Elkins et al. | |
| 2011/0164719 A1 | | 7/2011 | Aleshin | |

FOREIGN PATENT DOCUMENTS

| | | |
|---|---|---|
| JP | 61-139790 A | 6/1986 |
| JP | 02-287290 A | 11/1990 |
| JP | 04-230892 A | 8/1992 |
| JP | 06-500855 A | 1/1994 |
| JP | 08-166480 A | 6/1996 |
| JP | 08-262170 A | 10/1996 |
| JP | 10-160879 A | 6/1998 |
| JP | 2011-141278 A | 7/2011 |

\* cited by examiner

LOWER NOZZLE FOR USE IN NUCLEAR FUEL ASSEMBLY

The present invention relates to a lower nozzle for use in a nuclear fuel assembly.

BACKGROUND

A nuclear fuel assembly for Light Water Reactor (LWR), namely Boiling Water Reactor (BWR) or Pressurized Water Reactor (PWR), conventionally comprises a bundle of longitudinally extending fuel rods parallel to each other and arranged in a lattice, a lower nozzle and an upper nozzle at the longitudinal ends of the fuel assembly and a structure for connecting the lower nozzle and the upper nozzle.

In operation, the nuclear fuel assembly is placed in a nuclear reactor core such that the fuel rods extend vertically. Coolant fluid is caused to flow at high velocity longitudinally upwardly between the fuel rods. Coolant enters the nuclear fuel assembly through the lower nozzle and exits the nuclear fuel assembly through the upper nozzle. Water is used in LWR and serves as a coolant for thermal exchanges and as a moderator for the nuclear reaction.

Small debris present in the coolant might damage the fuel rods and lead to stopping the nuclear reactor in view of changing a damaged fuel rod in a fuel assembly or changing a whole fuel assembly. However, fuel assemblies are expensive and stopping the nuclear reactor is expensive for the operator. To mitigate this risk, in a known manner, a debris filter is placed upstream the bundle of fuel rods to trap debris. Conventionally the lower nozzle of a LWR fuel assembly comprises such a debris filter.

U.S. Pat. No. 4,684,495 discloses a lower nozzle for use in LWR fuel assemblies having a lower tie plate, a skirt extending axially from the lower tie plate and defining a housing and a debris filter snap-fitted in the housing.

SUMMARY OF THE INVENTION

An object of the invention is to provide an improved lower nozzle which filters efficiently and can be manufactured easily at low cost.

To this end, a lower nozzle for use in a nuclear fuel assembly is provided, of the type having an axis A-A and comprising a transverse lower tie plate for channelling the coolant through the lower tie plate and a tubular skirt extending axially from the periphery of the lower tie plate, the skirt delimiting an axial housing closed at one end by the lower tie plate and open at the opposite end, a debris filter configured for axial insertion in the housing and snap-fit springs for retaining the debris filter in the housing after insertion, wherein the springs are configured to shift the debris filter axially towards the lower tie plate.

In other embodiments, the lower nozzle may comprise any one of the following features, taken in isolation or in any technically feasible combination:
- the springs are configured to transversely center the debris filter in the housing;
- the springs are configured to seal gaps between side faces of the debris filter and inner faces of the housing;
- each spring snap-fits in a corresponding groove;
- each spring is fitted to one of a side face of the debris filter and an inner face of the housing, the groove being provided in the other one;
- each spring is fitted to a side face of the debris filter;
- each spring is elongated perpendicularly to axis A-A and comprises two lateral parts bearing against one of a side face of the debris filter and an inner face of the housing, and a central part protruding from the face and snap-fitted in a groove formed in the other face;
- each spring is configured for snap-fitting with bearing transversely on a wall such as to create an axial reaction force having an axial component shifting the debris filter axially towards the lower tie plate;
- each spring comprises a flange gripping a side edge of the debris filter for retaining the debris filter axially in the housing;
- the debris filter is maintained at a distance from the lower tie plate; and
- the skirt has a shoulder, the springs shifting the debris filter against the shoulder.

A nuclear fuel assembly is also provided comprising a lower nozzle as defined above.

BRIEF SUMMARY OF THE DRAWINGS

The invention and its advantages will be better understood on reading the following description given solely by way of example and with reference to the appended drawings, in which.

DETAILED DESCRIPTION

Figure 1:
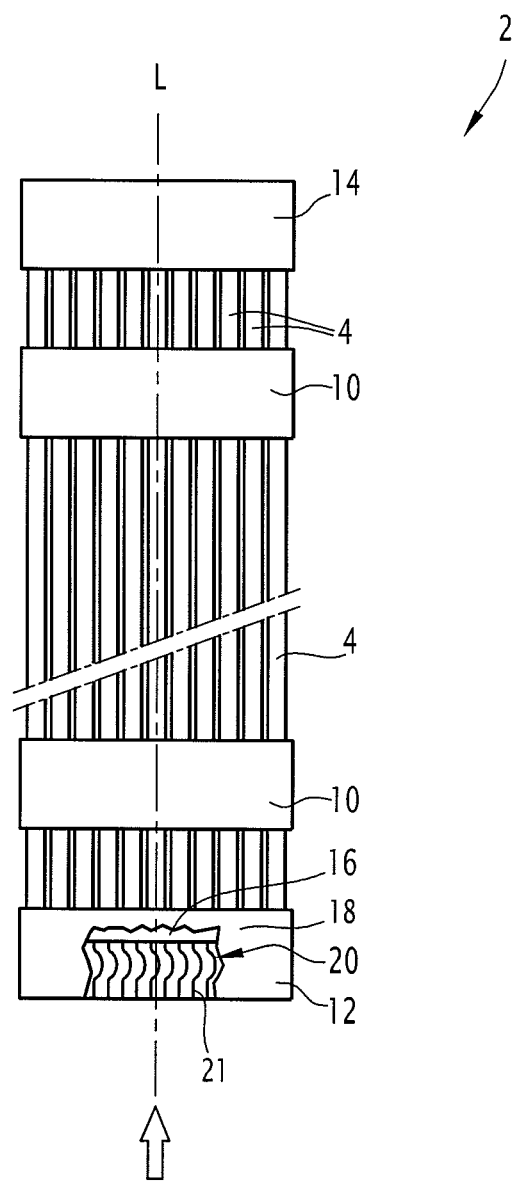
FIG. 1 is a diagrammatic cutaway side view of a light water reactor nuclear fuel assembly according to the invention.

As illustrated on FIG. 1, the nuclear fuel assembly 2 is elongated along a longitudinal central axis L.

In use, the fuel assembly 2 is placed in the core of a nuclear reactor with the axis L extending substantially vertically. In the following, the terms "lower", "upper", "transversal", "axial" and "longitudinal" refer to the position of the fuel assembly 2 in the reactor.

The fuel assembly 2 is for a light water reactor (LWR). It comprises a bundle of nuclear fuel rods 4. The fuel rods 4 extend longitudinally parallel to axis L.

Each fuel rod 4 comprises a tubular cladding filled with stacked nuclear fuel pellets and closed at its ends by end plugs. The fuel rods 4 are arranged in a lattice.

The fuel assembly 2 comprises fuel rod supporting spacer grids 10 distributed along the fuel rods 4, only two spacer grids 10 being visible on FIG. 1. The function of the spacer grids 10 is to maintain the fuel rods 4 axially and transversely with a transverse spacing between the fuel rods 4.

The fuel assembly 2 comprises a lower nozzle 12 and an upper nozzle 14 at the lower end and upper end respectively of the fuel assembly 2. The fuel rods 4 extend from the lower nozzle 12 to the upper nozzle 14.

In operation, coolant enters into the fuel assembly 2 through the lower nozzle 12, circulates longitudinally upwardly between the fuel rods 4 at high velocity and exits the fuel assembly 2 through the upper nozzle 14.

Figure 2:
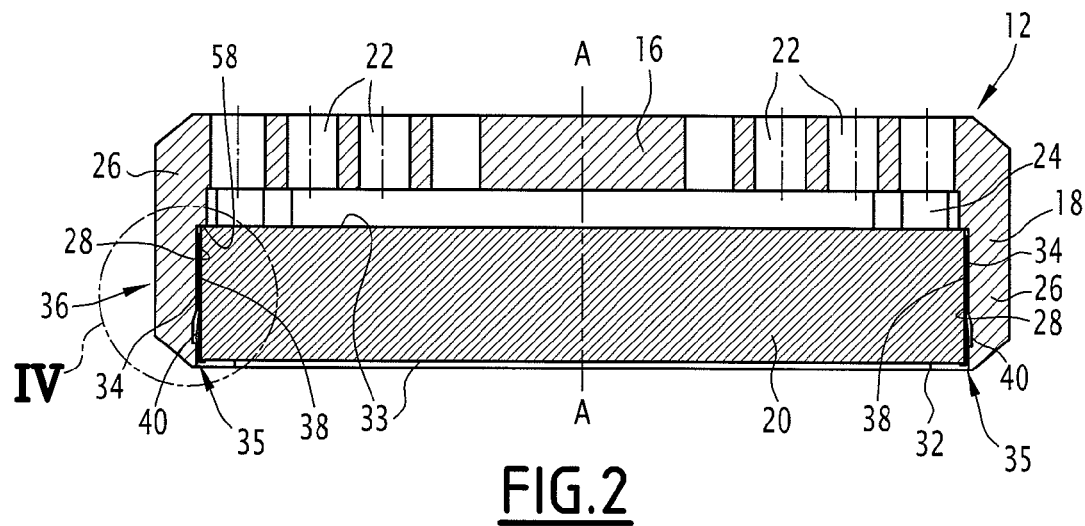
FIG. 2 is a sectional side view of the lower nozzle of the nuclear fuel assembly of FIG. 1.
Figure 3:
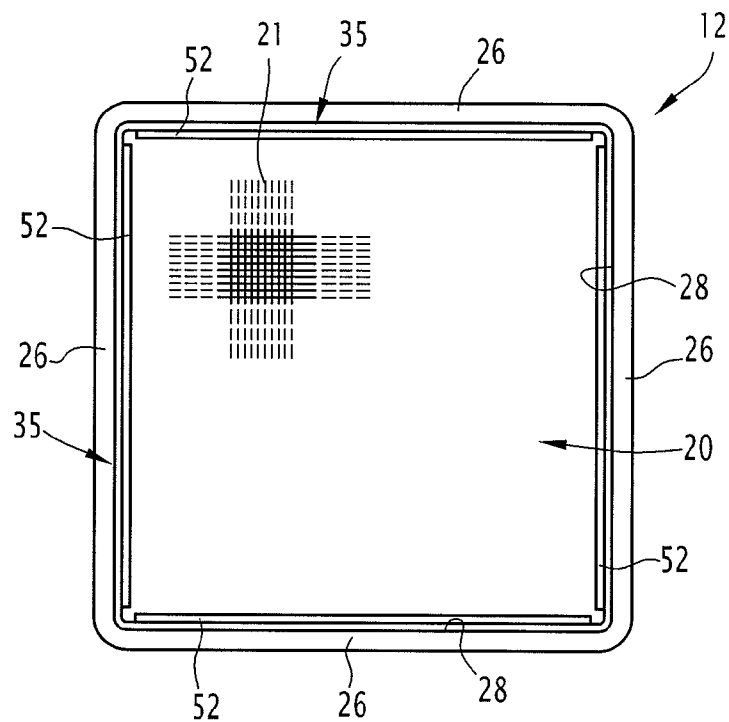
FIG. 3 is a bottom view of the lower nozzle of FIG. 2.

As illustrated on FIGS. 2 and 3, the lower nozzle 12 extends along an axis A-A coaxial with axis L of the fuel assembly 2 when the lower nozzle 12 is fitted to the fuel assembly 2. It comprises a lower tie plate 16, a skirt 18 and a debris filter 20.

The lower tie plate 16 extends transversely to axis A-A. It has through-apertures 22 for allowing coolant to flow through the lower tie plate 16.

The skirt 18 is tubular and extends axially downwardly from the periphery of the lower tie plate 16. The skirt 18 delimits an inner housing 24. The skirt 18 is formed of four interconnected sidewalls 26. Each sidewall 26 is continuous and the housing 24 has a closed cross-section. Each sidewall 26 has an inner face 28 delimiting the housing 24.

The housing 24 is closed at its upper axial end by the lower tie plate 16 and open at the opposed lower axial end. The lower end of the skirt 18 delimits an opening 32.

The debris filter 20 is received in the housing 24. The debris filter 20 is configured to be inserted axially upwardly in the housing 24 through the opening 32.

The debris filter 20 is configured to allow coolant to flow through the debris filter 20 while retaining debris present in the coolant.

The debris filter 20 is plate-shaped. The debris filter 20 has two opposed front faces 33 and side faces 34. The debris filter 20 has a cross-section compatible with that of the housing 24. The debris filter 20 here has four side faces 34.

The debris filter 20 is here schematically illustrated. In practice, the debris filter 20 comprises a peripheral frame and a filtering screen 21 (partially illustrated on FIGS. 1 and 3) extending across the frame, the screen 21 defining flow channels having shapes, dimensions and/or orientations allowing coolant to flow through the screen whilst retaining debris.

Each side face 34 of the debris filter 20 delimits a gap 35 with the corresponding inner face 28 delimiting the housing 24. The width of the gaps 35 is made as small as possible but exists for allowing insertion of the debris filter 20 in the housing 24.

The lower nozzle 12 comprises fixing means 36 for fixing the debris filter 20 in the housing 24.

The fixing means 36 comprise snap-fitting springs 38 and corresponding snap-fitting grooves 40. Each spring 38 is configured to snap-fit in the corresponding groove 40 upon insertion of the debris filter 20 into the housing 24. Each spring 38 snap-fitted in the corresponding groove 40 retains the debris filter 20 axially and prevents the debris filter 20 from being unintentionally removed from the housing 24.

The springs 38 are further configured for sealing the gaps 35 between the inner faces 28 of the skirt 18 and the side faces 34 of the debris filter 20. Each spring 38 is elongated and extends substantially perpendicularly to axis A-A over the whole length of the gap 35 between the side face 34 and an inner face 28 to seal the gap 35.

The springs 38 are mounted on the debris filter 20 and the grooves 40 are formed in the skirt 18. Each spring 38 is fitted to a respective side face 34 of the debris filter 20 and each groove 40 is formed in a respective inner face 28 of a sidewall 26 of the skirt 18. As illustrated, the debris filter 20 has one single spring 38 fitted to each side face 34.

The springs 38 are identical and the grooves 40 are identical. A spring 38 and a corresponding groove 40 will be further described with reference to FIGS. 4 and 5.

The spring 38 and the groove 40 are configured to seal a gap 35 between a side face 34 of the debris filter 20 and the corresponding inner face 28 of the housing 24, to axially shift the debris filter 20 upwardly and to transversely shift the debris filter 20 away from the inner face 28 to center the debris filter 20 in the housing 24.

The spring 38 is formed of a strip made of metal with high mechanical characteristics, e.g. Ni-based alloy, martensitic or precipitation-hardening stainless steel. The spring 38 is shaped and elongated in an extension direction S to be oriented parallel to the lower and upper edges of the corresponding side face 34 of the debris filter 20 (perpendicular to the plane of FIG. 4).

The spring 38 comprises a central part 42 between a lateral lower part 44 and a lateral upper part 46. The lower part 44 and the upper part 46 are configured to bear against the side face 34. The central part 42 is bulged to impart compressibility to the spring 38. The spring 38 can be compress by pushing the central part 42 towards the side face 34.

The central part 42 comprises a lower portion 48 and an upper portion 50 at an angle with respect to one another and with each of the lower part 44 and the upper part 46. The lower portion 48 extends obliquely upwardly from the lower part 44 and outwardly away from the side face 34. The upper portion 50 extends obliquely downwardly from the upper part 46 and outwardly away from the side face 34. The lower portion 48 and the upper portion 50 connect mutually at an apex of the central part 42.

The spring 38 comprises a gripping feature for gripping a lower edge of the side face 34 of the debris filter 20 to axially retain the debris filter 20. The gripping feature is here formed by a flange 52 extending from the lower part 44 at slightly acute angle with respect to the lower portion 48.

The spring 38 is fitted to the debris filter 20 in any appropriate manner. The lower part 44 is preferably fixed with regard to the debris filter 20 while the upper part 46 is free to slide along the side face 34 to allow elastic deformation of the central part 42. In the illustrated embodiment, the flange 52 bent downwards when the spring 38 is fitted to both the front face 33 and the side face 34 of the debris filter 20 and the corresponding deflection forces lead to bear the spring 38 against the side face 34 and to maintain it axially.

In an alternative embodiment, the lower part 44 may be fixed to the debris filter 20, for instance by welding or screwing or riveting.

Figure 4:
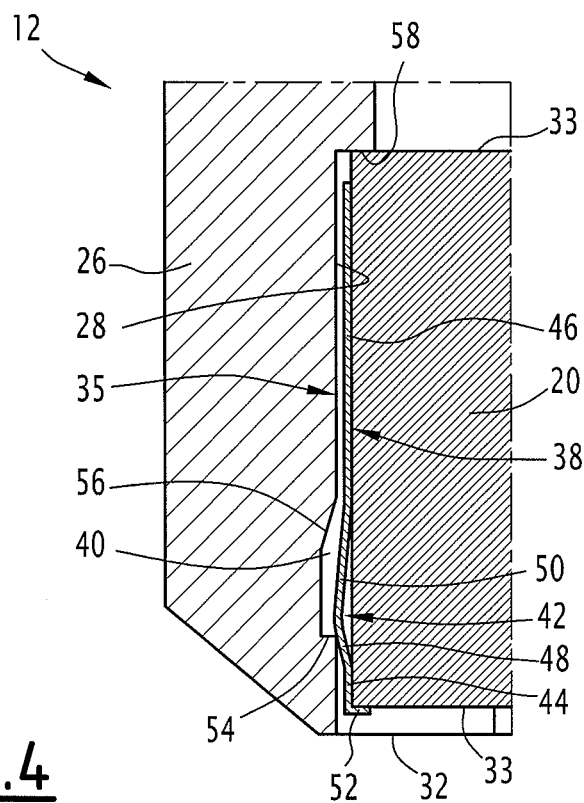
FIG. 4 is an enlarged view of zone IV on FIG. 2 illustrating a clamping and sealing spring.
Figure 5:
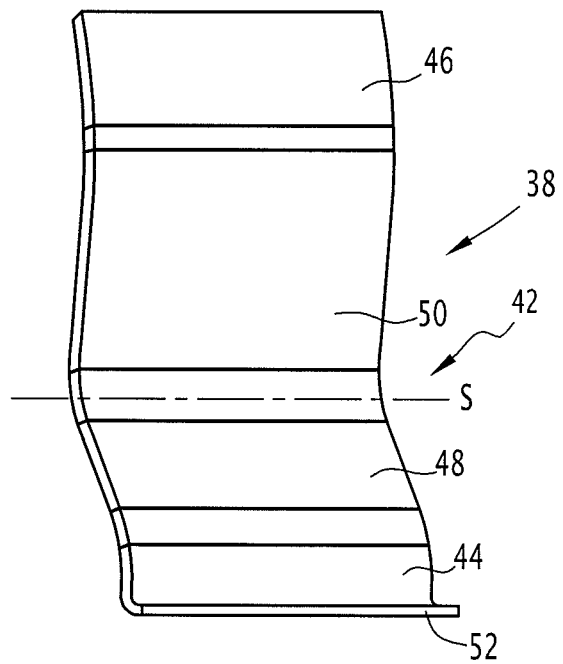
FIG. 5 is a partial perspective view of the clamping and sealing spring of FIG. 4.

As illustrated on FIG. 4, the groove 40 is configured to accommodate the central part 42 of the spring 38. The groove 40 is delimited in the inner face 28 of the sidewall 26 by a lower wall 54 and an upper wall 56.

The spring 38 and the groove 40 extend substantially over the whole length in the direction S of the gap 35 between the side face 34 of the debris filter 20 and the inner face 28 of the housing 24. The spring 38 is configured such that the central part 42 snap-fits in the groove 40. The spring 38 is more specifically configured such that the lower portion 48 of the bulged central part 42 bears transversely against the lower wall 54. The spring 38 and the lower wall 54 of the groove 40 contact each other along a line of contact extending preferably substantially over the whole length of the groove 40.

The spring 38 seals the gap 35 between the side face 34 and the inner face 28 thus preventing coolant and debris from by-passing the debris filter 20.

The spring 38 is further configured to shift the debris filter 20 transversely away from the inner face 28. To this end, the spring 38 is configured to be compressed when the debris filter 20 is inserted in the housing 24.

The spring 38 is configured to shift the debris filter 20 axially towards the lower tie plate 16.

In the illustrated embodiment, the lower portion 48 is inclined outwardly and upwardly and pressed against the lower wall 54. As a result, a reaction force is exerted inwardly and upwardly on the debris filter 20. The reaction force has a transverse component oriented inwardly and an axial component oriented upwardly.

Due to the transverse component, the springs 38 distributed around the debris filter 20 center the debris filter 20 in the housing 24. Due to the axial component, the springs 38 push the debris filter 20 axially upwardly towards the lower tie plate 16. The springs 38 thus retain the debris filter 20 axially inside the housing 24 in an efficient manner and prevent unintentional removal of the debris filter 20.

It is however possible to voluntary remove the debris filter 20 by pulling it downwardly to overcome the clamping force of the springs 38. A damaged debris filter is thus easily replaceable by simply extracting the damaged debris filter and replacing it by a new debris filter by simple axial upwardly insertion inside the housing 24.

In the presented embodiment, the spring 38 is borne against the side face 34 of the debris filter 20 and snap-fitted in a groove 40 formed in the inner face 28 of the housing 24. In alternative, the spring may be borne against the inner face 28 of the housing 24 and snap-fitted in a groove formed in the side face 34 of the debris filter 20.

As visible on FIG. 4, the skirt 18 comprises an internal square peripheral shoulder 58 located axially between the grooves 40 and the lower tie plate 16. The shoulder 58 is at a distance from the lower tie plate 16. The shoulder 58 faces downwardly. The shoulder 58 has an inner perimeter inferior to the outer perimeter of the debris filter 20. The outer perimeter of the upper front face 33 of the debris filter 20 abuts axially against the shoulder 58 under the effect to the springs 38.

Owing to the springs 38, the debris filter 20 is thus clamped axially between the lower walls 54 of the grooves 40 and the shoulder 58 to avoid axial movement. The debris filter 20 is maintained at an axial distance from the lower tie plate 16 for an appropriate channeling of the coolant through the lower tie plate 16.

Further, the outer perimeter of the upper front face 33 being pressed onto the shoulder 58 creates a supplementary sealing contact preventing debris from by-passing the debris filter 20 through a gap 35.

The invention applies to lower nozzles for nuclear fuel assembly for use in Boiling Water Reactor (BWR) and Pressurized Water reactor (PWR).

It may also apply to lower nozzles for nuclear fuel assembly for use in other types of Light Water Reactor (LWR) such as Water-Water Energetic Reactor (VVER).

Hence, in a general manner, the invention applies to lower nozzles and more generally to lower and upper nozzles for nuclear fuel assembly for use in water-cooled reactors.

What is claimed is:

1. A lower nozzle for use in a nuclear fuel assembly and having an axis, the lower nozzle comprising:
   a transverse lower tie plate for channeling a coolant through the lower tie plate;
   a tubular skirt extending axially from a periphery of the lower tie plate, the skirt including sidewalls extending axially downward from the lower tie plate delimiting an axial housing closed at one end by the lower tie plate and open at an opposite end; and
   a debris filter configured for axial insertion in the housing and snap-fit springs for retaining the debris filter in the axial housing after insertion, the debris filter including a top front face facing the lower tie plate, a bottom front face facing away from the lower tie plate and side faces extending axially downward from the top front face to the bottom front face, the snap-fit springs each being positioned between one of the sidewalls of the tubular skirt and one of the side faces of the debris filter facing said sidewall, the snap-fit springs configured to clamp the debris filter to the tubular skirt and press the debris filter axially towards the lower tie plate after insertion by contacting the sidewalls and the side faces at locations axially between the top front face and the bottom front face.

2. The lower nozzle according to claim 1, wherein the snap-fit springs are configured to transversely center the debris filter in the housing.

3. The lower nozzle according to claim 1, wherein the snap-fit springs are configured to seal gaps between side faces of the debris filter and inner faces of the axial housing.

4. The lower nozzle according to claim 1 wherein each snap-fit spring snap-fits in a corresponding groove.

5. The lower nozzle according to claim 4, wherein each snap-fit spring is fitted to one of a side face of the debris filter and an inner face of the housing, the corresponding groove being provided in the other one of the side face of the debris filter and the inner face of the housing.

6. The lower nozzle according to claim 1, wherein each snap-fit spring is fitted to a side face of the debris filter.

7. The lower nozzle according to claim 1, wherein each snap-fit spring is elongated perpendicularly to the axis and comprises two lateral parts bearing against one of a side face of the debris filter and an inner face of the housing, each snap-fit spring comprising a central part protruding from the one of the side face and the inner face and snap-fitted in a groove formed in the other of the side face and the inner face.

8. The lower nozzle according to claim 1, wherein each snap-fit spring is configured for snap-fitting with bearing transversely on a wall such as to create an axial reaction force having an axial component shifting the debris filter axially towards the lower tie plate.

9. The lower nozzle according to claim 1, wherein each snap-fit spring comprises a flange gripping a side edge of the debris filter for retaining the debris filter axially in the housing.

10. The lower nozzle according to claim 1, wherein the debris filter is maintained at a distance from the lower tie plate.

11. The lower nozzle according to claim 1, wherein the skirt has a shoulder, the snap-fit springs pressing the debris filter axially against the shoulder.

12. A nuclear fuel assembly comprising:
    a bundle of nuclear fuel rods;
    an upper nozzle; and
    the lower nozzle as recited in claim 1, the nuclear fuel rods extending from the lower nozzle to the upper nozzle.

13. The lower nozzle according to claim 1, wherein the snap-fit springs axially clamp the debris filter to avoid axial movement of the debris filter.

14. The lower nozzle according to claim 1, wherein the snap-fit springs transversely clamp the debris filter.

15. The lower nozzle according to claim 1, wherein the debris filter is in the shape of a plate and has an upper face pressed axially against a shoulder of the lower tie plate owing to the snap-fit springs.

16. A lower nozzle for use in a nuclear fuel assembly and having an axis, the lower nozzle comprising:
    a transverse lower tie plate for channeling a coolant through the lower tie plate;
    a tubular skirt extending axially from a periphery of the lower tie plate, the tubular skirt delimiting an axial housing closed at one end by the lower tie plate and open at an opposite end; and a debris filter configured for axial insertion in the housing and snap-fit springs for retaining the debris filter in the axial housing after insertion, the snap-fit springs each including a lateral upper part, a central bulged part below the lateral upper part and a lateral lower part below the central bulged part, the snap-fit springs configured to clamp the debris filter to the tubular skirt by contacting the tubular skirt or the debris filter via the central bulged part so the central bulged parts press the debris filter axially towards the lower tie plate after insertion, the snap-fit springs axially clamping the debris filter to the tubular skirt to avoid axial movement of the debris filter, the snap-fit springs transversely clamping the debris filter to the tubular skirt by contacting the tubular skirt or the debris filter via the central bulged parts, the housing being open at a lower axial end thereof and the debris filter being shifted upwardly by the central bulged parts of the snap-fit springs contacting the tubular skirt or the debris filter.

17. The lower nozzle as recited in claim 16 wherein the lateral upper part and lateral lower part of each of the snap-fit springs contact a respective side face of one of the tubular skirt and the debris filter and each of the central bulged parts extends into a groove in a respective axially extending wall of the other of the tubular skirt and the debris filter.

18. A lower nozzle for use in a nuclear fuel assembly and having an axis, the lower nozzle comprising:
   a transverse lower tie plate for channeling a coolant through the lower tie plate;
   a tubular skirt extending axially from a periphery of the lower tie plate, the tubular skirt delimiting an axial housing closed at one end by the lower tie plate and open at an opposite end; and
   a debris filter configured for axial insertion in the housing and snap-fit springs for retaining the debris filter in the axial housing after insertion, the snap-fit springs each configured to extend into a groove formed in a respective axially extending wall to clamp the debris filter to the tubular skirt and press the debris filter axially towards the lower tie plate after insertion, each snap-fit spring being configured for snap-fitting by bearing transversely on the respective axially extending wall such as to create an axial reaction force having an axial component shifting the debris filter axially towards the lower tie plate, the snap-fit springs axially clamping the debris filter to the tubular skirt to avoid axial movement of the debris filter, the snap-fit springs transversely clamping the debris filter to the tubular skirt, the housing being open at a lower axial end thereof and the debris filter being shifted upwardly by the snap-fit springs, the debris filter being in the shape of a plate and having an upper face pressed axially against a shoulder of the lower tie plate owing to the snap-fit springs.

19. The lower nozzle as recited in claim 18 wherein the snap-fit springs each includes a lateral upper part, a central bulged part below the lateral upper part and a lateral lower part below the central bulged part, the central bulged part protruding transversely away from the lateral lower part and the lateral upper part to extend into the respective groove.

* * * * *